United States Patent [19]

Carey

[11] Patent Number: 5,327,036
[45] Date of Patent: Jul. 5, 1994

[54] SNAP-ON FAN COVER FOR AN ELECTRIC MOTOR

[75] Inventor: Timothy W. Carey, Grabill, Ind.

[73] Assignee: General Electric Company, Fort Wayne, Ind.

[21] Appl. No.: 6,254

[22] Filed: Jan. 19, 1993

[51] Int. Cl.$^5$ .......................... H02K 5/00; H02K 5/24
[52] U.S. Cl. .......................................... 310/89; 310/51; 310/85
[58] Field of Search .................. 310/89, 51, 85, 42, 310/58, 62, 63; 220/307

[56] References Cited

U.S. PATENT DOCUMENTS

| | | | |
|---|---|---|---|
| 4,356,930 | 11/1982 | Roper | 220/307 |
| 4,513,214 | 4/1985 | Dieringer | 310/89 X |
| 4,534,088 | 8/1985 | Ricke | 220/307 |
| 4,742,935 | 5/1988 | Schellenberg | 220/307 |
| 5,008,575 | 4/1991 | Ishimoto et al. | 310/89 |
| 5,026,476 | 6/1991 | Ishimoto et al. | 310/89 |
| 5,059,843 | 10/1991 | Ishimoto et al. | 310/89 |

FOREIGN PATENT DOCUMENTS

| | | |
|---|---|---|
| 3532713 | 3/1987 | Fed. Rep. of Germany . |
| 1475024 | 2/1967 | France . |
| 2539930 | 6/1984 | France . |
| 63-305731 | 12/1988 | Japan . |
| 49745 | 7/1964 | Poland . |

Primary Examiner—R. Skudy
Assistant Examiner—E. To
Attorney, Agent, or Firm—Ralph E. Krisher, Jr.

[57] ABSTRACT

A motor assembly has a stator and rotor housed within a frame. An end shield is attached to one end of the frame for rotatably supporting a shaft extending therethrough. A fan is mounted to the shaft adjacent the end shield. A fan cover is mounted to the end shield and about the fan in a snap-fit manner. The end shield includes a front face and an annular side face, and has a plurality of slots formed in the annular face. The end shield also includes a boss adjacent each slot, which is formed to include at least one bearing surface and a ramp thereon. The fan cover includes a plurality of mounting brackets spaced about its inner periphery and extending outwardly toward the end shield. Each mounting bracket has a projection thereon, which is receivable within the slot on the annular face of the end shield. Each bracket also includes a backstop with a crushable rib thereon. As the projection is received in the slot, the bearing surface of the boss contacts and deforms the crushable rib on the backstop, thus ensuring a tight, snap-fit between the fan cover and the end shield.

13 Claims, 3 Drawing Sheets

FIG_1

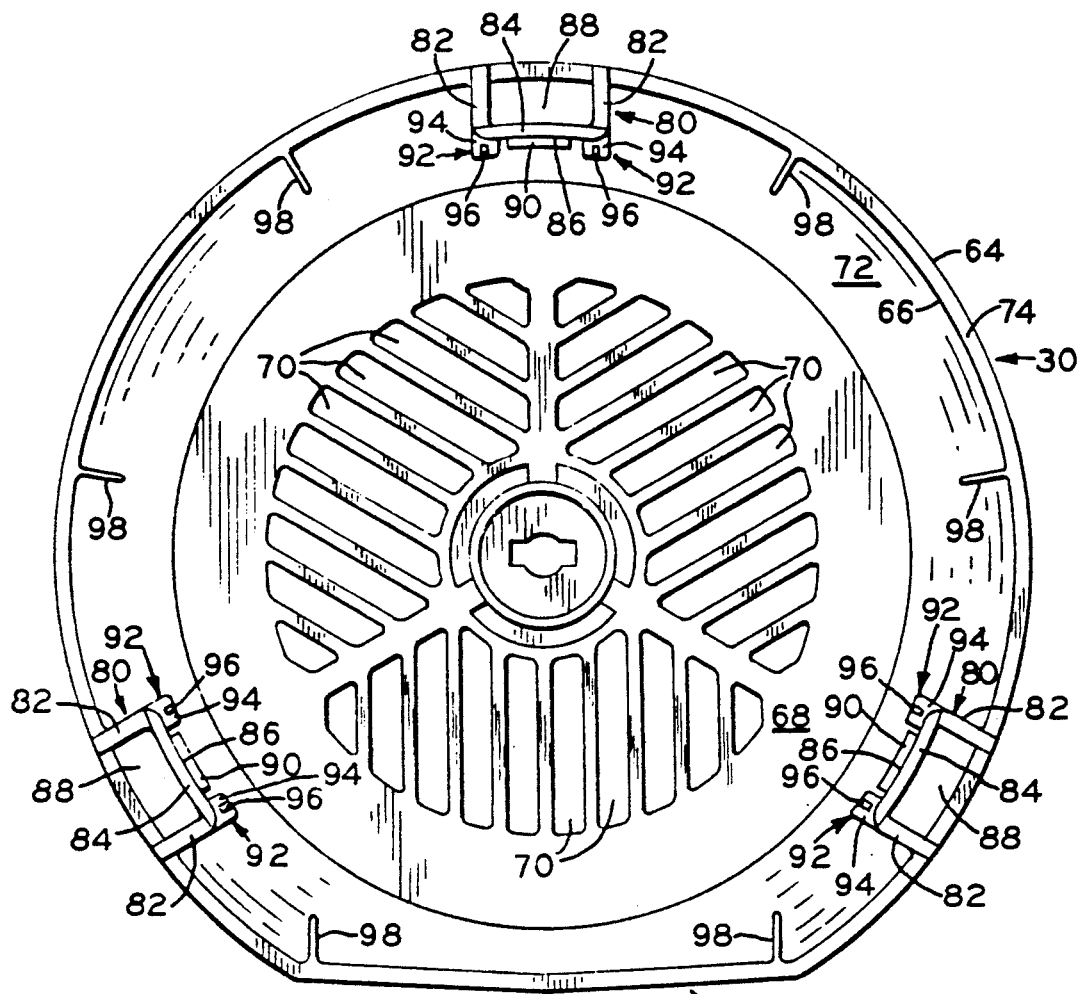
FIG_4
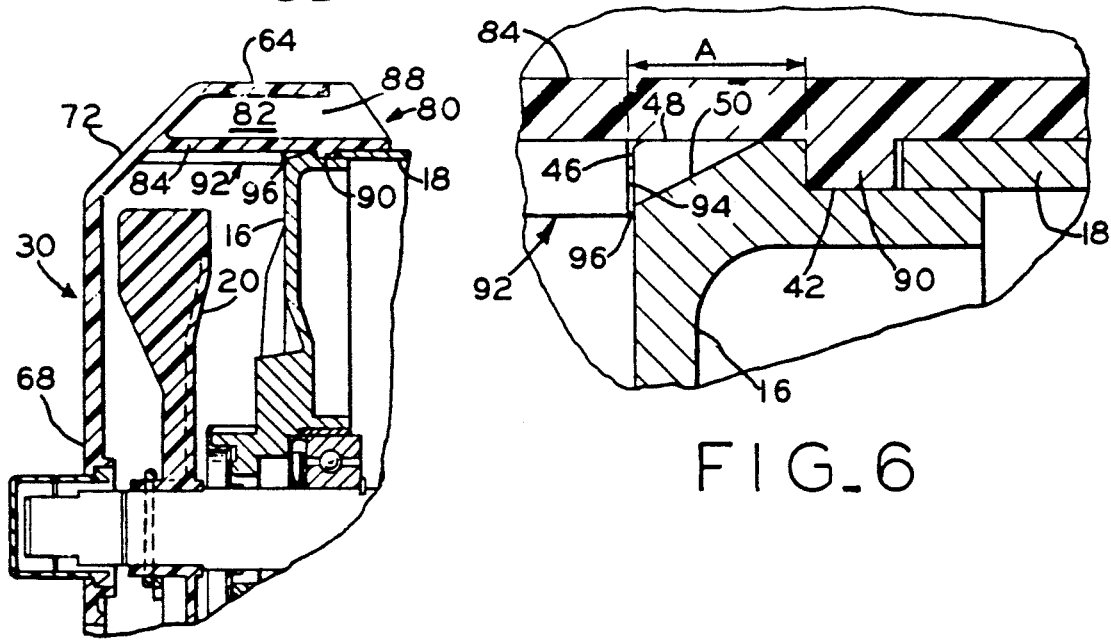
FIG_5
FIG_6

SNAP-ON FAN COVER FOR AN ELECTRIC MOTOR

BACKGROUND AND SUMMARY OF THE INVENTION

The present invention is related to motors. More particularly, the present invention is related to a snap-on fan cover for use within an enclosed motor.

In certain applications, it is desirable to utilize an electric motor which is totally enclosed. Small electric motors, such as those used in refrigeration and air conditioning units, typically include a stator, a rotor and a frame or housing. The stator assembly typically includes a stator core and one or more windings disposed thereabout. The rotor includes a shaft rotatably mounted within the stator. The shaft is supported by bearing assemblies, and extends in a longitudinal direction through the motor. The stator, rotor, bearings and intermediate portions of the shaft are housed within the frame. An end shield is attached to opposite ends of the frame to enclose the motor.

To cool the motor, a fan is mounted to one end of the rotary shaft, adjacent the end shield. The fan creates an air flow about the exterior of the frame. To protect the fan blades from damage, a fan cover is placed about the fan. The fan draws ambient air through the fan cover and directs it about the motor frame.

During assembly of the motor, the frame may be placed on end, such that the longitudinal axis of the motor is substantially vertical to the assembly work station. This enables the assembler to easily attach the end shield to the frame, and the fan to the rotary shaft. The fan cover can then be positioned about the fan. During this assembly, several features are particularly advantageous. For example, it is desirable that the fan cover be quickly and easily connected to the motor. A typical fan cover may be bolted or screwed to the frame or end shield. In this type of arrangement, a substantial amount of assembly time is required. Each bolt or screw is installed and the motor is turned on its side and/or rotated to access each successive bolt. The time required to install the fan cover can be costly in a high volume production setting. Furthermore, the necessary associated hardware can be expensive, and difficult to handle.

Another concern during assembly is determining proper rotational alignment of the fan cover to the end shield. In certain arrangements where the fan cover is bolted or screwed in place, there is no mechanical means of determining proper alignment. Instead, the fan cover is positioned by visually aligning the bolt holes in the cover to the holes in the frame or end shield. This takes time. A fan cover which includes a mechanical aid to determine rotational alignment of the cover to the end shield or frame would thus ease and quicken assembly.

While fan covers which are bolted to the frame or end shield may not be efficient, they do generally securely fasten the cover to the frame. This feature is beneficial for at least two reasons. First, a strong engagement ensures that the fan cover will protect the fan from damage, and limit the flow of debris through the fan blades. Second, a tight fit between the fan cover and motor frame or end shield limits the effects of vibrational forces. During operation, the fan cover may tend to vibrate with respect to the frame. This may cause the cover to audibly rattle and, over time, loosen.

An object of the present invention is to provide a motor which utilizes an improved fan cover which can be attached to the end shield in a quick and easy manner.

Another object of the present invention is to provide a motor which utilizes an improved fan cover which ensures and facilitates proper rotational alignment between the cover and the end shield during assembly.

A further object of the present invention is to provide a motor which utilizes an improved fan cover which is securely fastened to the end shield.

A still further object of the present invention is to provide a motor having an improved fan cover which is resistant to the effects of vibrational forces.

These and other objects are attained in a motor having a stator and rotor housed within a frame. The rotor includes a rotary shaft, which extends outside of the frame. An end shield is attached to each end of the frame, enclosing the motor. A fan is attached to one end of the rotary shaft, and is used to cool the exterior of the frame. A fan cover substantially surrounds the fan, and is snap-fit to the end shield.

The end shield includes a front face and an annular face having a plurality of receiving slots therein. Adjacent each slot is a boss. The boss includes an inclined ramp leading to the slot. Adjacent the ramp, on opposite sides thereof, the boss includes bearing surfaces which are substantially coplanar to the front face of the end shield. The boss also includes opposing top surfaces which are substantially coplanar to the annular face of the end shield.

The fan cover includes an exterior surface with a vent therein, and an annular rim surrounding the periphery of the exterior surface. Mounting brackets are spaced apart on the annular rim, and allow the fan to be attached to the end shield. Each bracket has a projection thereon which is receivable within the slot on the end shield. The bracket also includes a pair of backstops, each having a stop surface. Each stop surface includes a crushable rib thereon, which is deformable when subjected to a load.

The fan cover can be snap-fit onto the end cover for easy assembly. The cover is positioned such that the projections on the brackets are aligned with the ramp on the boss. In this position, the projection is locked between the ramp sidewalls, limiting rotation of the fan cover with respect to the frame. The cover is pushed onto the frame until the projection is received within the slot. The bearing surfaces on the boss contact and crush the ribs on the stop surface. In this manner, a friction fit between the fan cover and the end shield is achieved.

Other objects, advantages and novel features of the present invention will become apparent from the following detailed description of the invention when considered in conjunction with the accompanying drawings.

BRIEF DESCRIPTION OF THE DRAWINGS

FIG. 4 shows a plan view of the interior of a fan cover constructed in accordance with the present invention.

FIG. 5 shows a partial cross-section of a motor assembly constructed in accordance with the present invention.

FIG. 6 shows an enlargement of a portion of the cross-section of FIG. 5.

DETAILED DESCRIPTION OF THE DRAWINGS

Figure 1:
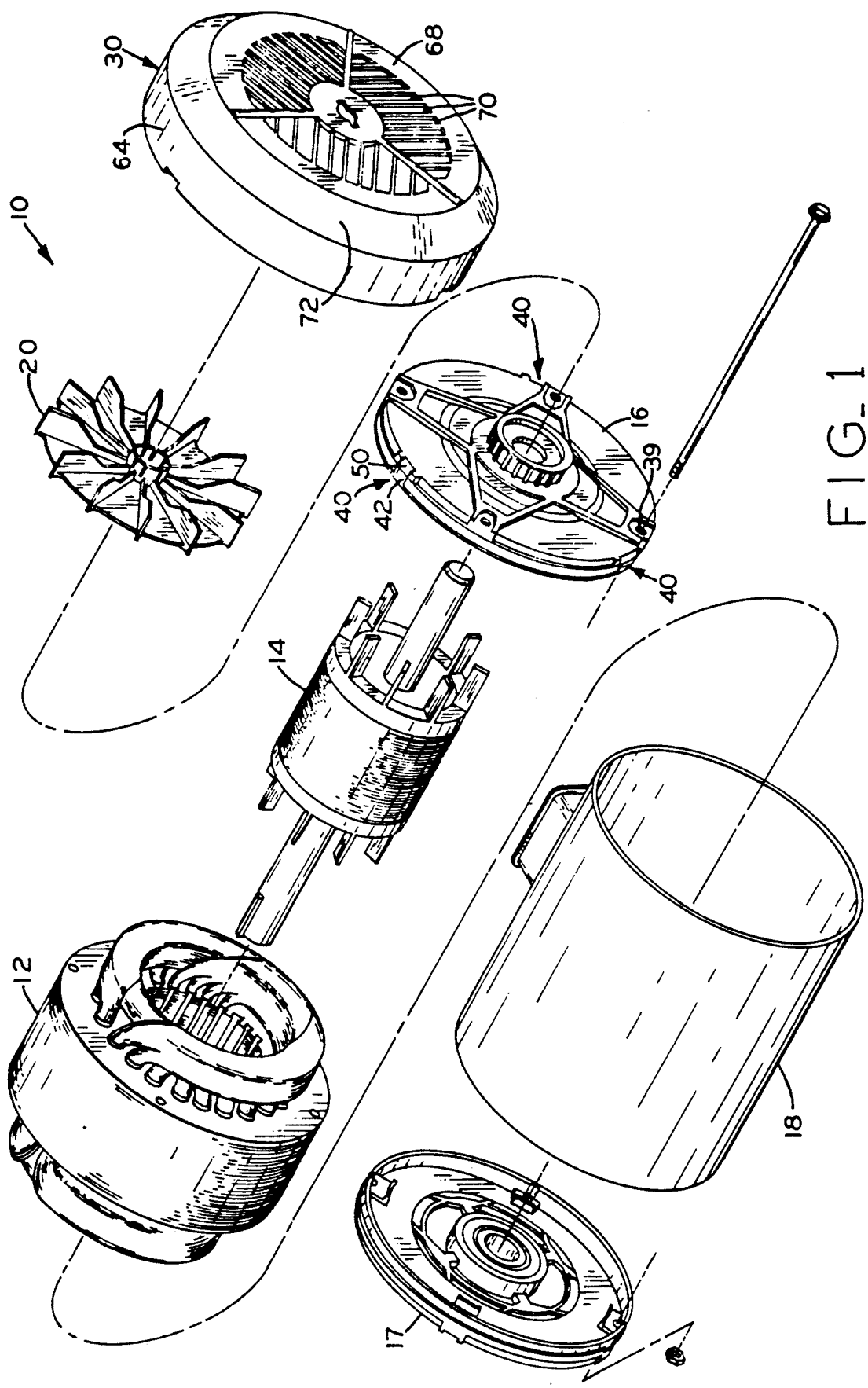
FIG. 1 shows an exploded view of a motor assembly constructed in accordance with the present invention.

FIG. 1 shows an exploded view of a motor assembly 10 constructed in accordance with the present invention. Motor assembly 10 includes a stator 12, a rotor 14, and end shields 16 and 17, all mounted to or housed by frame 18. The present invention is particularly directed to a motor assembly 10 which is totally enclosed and fan cooled. Thus, a fan 20 is mounted adjacent end shield 16 and rotates with rotor shaft 22 which extends longitudinally through motor assembly 20. Fan 20 creates an airflow about the exterior of frame 18.

Motor assembly 10 also includes fan cover 30 which is attached to end shield 16 and positioned about fan 20. Fan cover 30 shields and protects fan 20. Fan cover 30 also assists in directing the flow of air in a longitudinal direction along frame 18.

Figure 2:
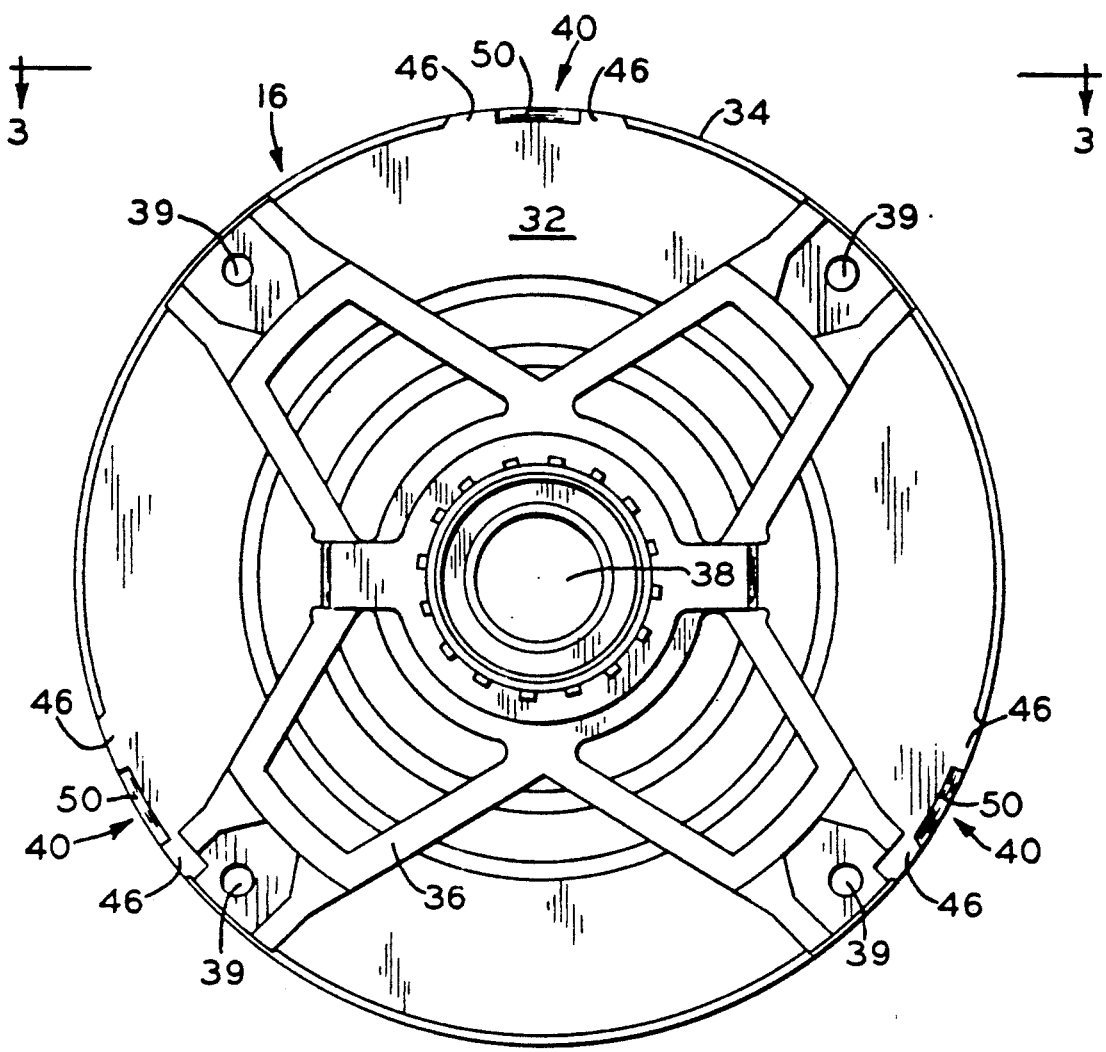
FIG. 2 shows a plan view of an end shield of a motor assembly constructed in accordance with the present invention.
Figure 3:
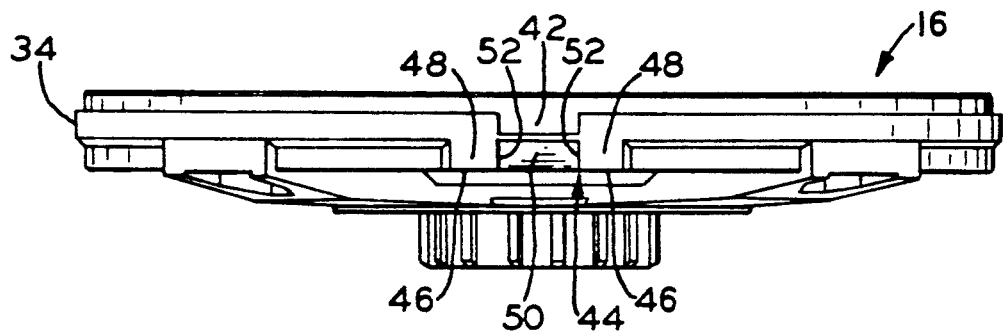
FIG. 3 shows a side view of the end shield of FIG. 2.

FIG. 2 shows a front, plan view of end shield 16 of motor assembly 10. FIG. 3 shows a side view of end shield 16. End shield 16 is of a generally circular design having a front face 32 and an annular peripheral face or surface 34. Front face 32 includes a rib network 36 which is provided to stiffen and reinforce end shield 16. A bore 38 is centrally located in front face 32 of end shield 16 for receiving the rotating shaft of rotor 14 which is supported by a bearing (not shown) which, in turn, is supported by a bearing receiving depression formed in the rear face (not shown) of end shield 16. A plurality of bolt receiving openings 39 are provided to receive through bolts which extend through motor assembly 10 to secure end shields 16 and 17 to housing 18.

End shield 16 further includes three "receiving" structures 40 symmetrically spaced about its periphery. However, it should be well understood that the scope of the present invention is not limited by the specific number of receiving structure located on end shield 16. Receiving structure 40 is designed to engage a portion (bracket 80) of fan cover 30, as will be discussed in more detail below. Each receiving structure includes a slot 42 (visible in FIGS. 1 and 3) formed in annular face 34. Slot 42 is generally rectangular in cross-section, with a longitudinal axis extending circumferentially along the surface of annular face 34.

Receiving structure 40 also includes a raised area or boss 44 immediately adjacent slot 42. Boss 44 is face 34 in which slot 42 is formed. Boss 44 includes spaced bearing surfaces 46, and top surfaces 48. Spaced bearing surfaces 46 and top surfaces 48 are spaced apart by a distance approximately equal to the length of slot 42. Bearing surfaces 46 are substantially coplanar with front face 32, and top surfaces 48 are substantially coplanar with annular face 34. To allow portions of selected bearing surfaces 46 to rest substantially flush with front face 32, portions of rib network 36 may be removed or otherwise modified.

Intermediate spaced bearing surfaces 46 and top surfaces 48, boss 42 includes an inclined ramp 50. Ramp 50 is inclined from front face 32 to annular face 34, and provides a uniform transition from the front face to the annular face. Ramp 50 also defines opposing inside surfaces 52 and 53, which extend substantially orthogonally to the surface of ramp 50.

FIG. 4 shows an interior view of fan cover 30. Fan cover 30 is designed to fit over fan 20 and attach to end shield 16. Fan cover 30 is preferably formed in a single piece of a rigid, sturdy material, such as an ABS resin. One such material is Cycolac, a General Electric product. Fan cover 30 has a generally circular cross-section with the exception of flattened bottom 62. Fan cover 30 has an annular exterior surface 64 and an opposing annular interior surface 66 which extend substantially orthogonally to (and out of the paper in FIG. 4) a generally circular back 68. A plurality of vent openings 70 are formed in back 68. Exterior surface 64 transitions to back 68 via an angular portion 72. Edge surface 74, which extends substantially orthogonally to and connects interior surface 66 and exterior surface 64, forms the peripheral edge of fan cover 30.

Fan cover 30 also includes mounting brackets 80 for mounting the fan cover to end shield 16. In the embodiment shown in the figures, three brackets 80 are symmetrically and circumferentially spaced along interior surface 66. A greater or fewer number of brackets may be utilized in other embodiments. The scope of the present invention is not to be limited by the number of brackets 80 which are utilized.

Bracket 80 includes opposing legs 82 which extend radially inwardly from interior surface 66. Legs 82 are joined at their respective distal ends by connecting member 84 which includes an inwardly facing surface 86. Surfaces 86 are substantially concentric with interior surface 66, and define a circumference which is substantially equal to the circumference of end shield 16 and motor housing 18. Bracket 80 forms hollow 88 which is enclosed by opposing legs 82, member 84 and a portion of interior surface 66.

Projections 90 are formed on and extend radially inwardly from surfaces 86. Each projection 90 is a substantially rectangular body, with its longitudinal axis directed circumferentially with respect to mounting surface 86. The dimensions of projection 90 allow it to be snugly received within slot 42 in end shield 30, as will be described in additional detail below.

Surface 86 also includes two backstops 92 formed thereon. Each backstop 92 is a generally rectangular body extending radially from mounting surface 86, and extending in a longitudinal direction substantially parallel to the longitudinal axis of motor assembly 10 (i.e., into the paper as viewed in FIG. 4). Each backstop 92 includes stop surface 94. Stop surface 94 is disposed substantially orthogonally to mounting surface 86. Stop surface 94 includes crushable rib 96 thereon. Crushable rib 96 projects orthogonally from stop surface 94. Crushable rib 96 is integrally formed with stop surface 94, and is designed to be deformed or crushed when a load is applied thereto.

Fan cover 30 also includes a plurality of ribs 98. Ribs 98 project radially inwardly from interior surface 66 a distance approximately equal to the distance of radial projection of leg 82 of bracket 80. Though not totally enclosed, the circumferential space between adjacent ribs 98 generally forms a channel through which air flows and is directed longitudinally along the exterior surface of housing 18.

FIG. 5 shows a partial cross-section of motor assembly 10, including portions of end shield 16, fan 20 and fan cover 30 in the assembled condition. FIG. 6 shows an enlarged portion of FIG. 5 which further illustrates the interactions between the various components of bracket 80 of fan cover 30 and the surfaces and structures associated with receiving structure 40 of end shield 16. Briefly, projection 90 of bracket 80 extends downwardly into slot 42 of end shield 16. Stop surface 94 of back stop 92 abuts bearing surface 46. To ensure a tight, vibration resistant fit, crushable rib 96 is disposed on surface 94 and is designed to be deformed or crushed upon installation of cover 30 to assure tight "contact" between stop surface 94 and bearing surface 46. (Due to the presence of crushable rib 96, stop surface 94 and bearing surface 46 may not actually come in contact. However, crushable rib 96 may be viewed as an extension of stop surface 94, for purposes of this discussion.)

As can be seen in FIGS. 5 and 6, stop surface 94 and projection 90 are longitudinally spaced by a distance A (FIG. 6). The presence of crushable ribs 96 allow for relatively large tolerance variations in the corresponding dimensions of cover 30 and/or end shield 16, while assuring a tight, vibration resistant fit at each of the brackets 80 of the motor assemblies constructed in accordance with the present invention.

Motor assembly 10 of the present invention is designed to be easily and quickly assembled. Typically, during assembly, motor assembly 10 will be disposed such that the longitudinal axis of the motor is substantially vertical to the assembly work station. Once stator 12 and rotor 14 are secured within frame 18, end shield 16 is attached to the frame. Fan 20 is then mounted to shaft 22, which extends through end shield 16. Fan cover 30 can then be snap-fit to end shield 16, thus covering and shielding fan 20.

Fan cover 30 is positioned such that each bracket 80 is circumferentially aligned with a respective boss 44 on end shield 16. Fan cover 30 is pushed towards end shield 16 until projections 90 contact respective ramps 50. In this position, rotational orientation of fan cover 30 relative to end shield 16 is ensured. If the assembler attempts to rotate the fan cover, projections 90 will contact inside walls 52 of boss 42, thus preventing further rotation of the cover. Thus, the present invention ensures proper rotational alignment of fan cover 30 to end shield 16, prior to final installation.

Fan cover 30 is then pushed further towards end shield 16. As projection 90 travels the incline of ramp 50, cover 30, although generally rigid, resiliently deforms (i.e., the open end of cover 30 expands). Thus, as projection 90 travels ramp 50, bracket 80 is pushed radially away from its rest position.

After projection 90 clears ramp 50, it reaches slot 42. The tension in bracket 80 is released as projection 90 snaps into engagement with slot 42. The assembler is ensured that fan cover 30 is securely engaged to end shield 16 because of the audible sound of bracket 80 snapping into engagement with slot 42, and because the cover will not move, either longitudinally, or rotationally, relative to motor 10.

As projections 90 snap into engagement with slots 42, bearing surfaces 46 of boss 44 encounter stop surfaces 94 of brackets 80. Thus, fan cover 30 is prevented from further longitudinal translation with respect to frame 18 in either direction. To reduce relative vibration between fan cover 30 and end shield 16, it is beneficial that bearing surface 46 actually abut and contact stop surface 94. Frictional forces between these two surfaces will reduce vibration. In other words, it is desired that the longitudinal distance between front face 32 of end shield 16 and slot 40 be equal to the longitudinal distance between stop surface 94 and projection 90 of cover 30. However, it may be relatively difficult and expensive to maintain precise dimensions and tolerances during the manufacture of these components.

Crushable ribs 96 serve as a means for limiting the impact of tolerance variations between these two distances. As projection 90 snaps into slot 42, bearing surface 46 contacts crushable rib 96. The tension in bracket 80 and the force applied by the assembler cause bearing surface 46 to crush, or deform, crushable rib 96. The crushed rib fills any gap between bearing surface 46 and stop surface 94 which might otherwise occur. Thus, the two surfaces effectively meet and contact one another, and the impact of variations in manufacturing tolerances are reduced.

Once fan cover 30 is snapped onto end shield 16, ribs 98 project inwardly toward annular face 34 of end shield 30. These ribs, coupled with annular face 34 and the exterior of frame 18 and interior surface 66 form air flow channels which open toward the longitudinally extending outer surface of frame 18. Air is drawn into the assembly through vent 66 by fan 20. The air is then directed through these channels, and over the exterior of frame 18, thus cooling motor assembly 10.

To remove fan cover 30 from end shield 16, a screwdriver or similar prying device can be inserted into hollow 88 of bracket 80, and projection 90 can be pried from its engagement with slot 42. Fan cover 30 can then be lifted from engagement with the end shield.

From the proceeding description of an embodiment of the invention, it is evident that the objects of the invention have been attained. Although this invention has been described and illustrated in detail, it is to be clearly understood that the same is by way of illustration and example only and is not to be taken by way of limitation. Therefore, the spirit and scope of this invention are to be limited only by the terms of the appended claims.

What is claimed is:

1. An electric motor, comprising:
   a frame;
   a stator supported by said frame;
   at least one end shield mounted to said frame;
   a rotor rotatably supported by the end shield adjacent said stator;
   a fan rotatably mounted adjacent the end shield;
   a cover mounted adjacent the fan;
   wherein said end shield has a front face and an annular face and receiving means formed in the annular face for receiving and engaging a portion of said cover, said receiving means including at least one slot in said annular face, and a bearing surface disposed substantially coplanar to said front face for engaging a portion of said cover;
   wherein said cover has mounting means for cooperating with said receiving means, comprising at least one bracket extending from a peripheral surface of the cover, said bracket having a projection extending substantially orthogonally therefrom for engagement with said slot, and at least one back stop for engaging the bearing surface of the end shield; and
   wherein said bracket comprises a surface, radially inwardly spaced from the peripheral surface of the cover and extending substantially concentrically therewith, and wherein said projection extends substantially orthogonally from said inwardly spaced surface.

2. The motor according to claim 1, wherein said backstop extends along and from said inwardly spaced surface.

3. The motor according to claim 1, wherein said end shield includes rotational guide means for ensuring proper rotational orientation of said end cover relative to said end shield.

4. The motor according to claim 3, wherein said rotational guide means includes an inclined ramp transitioning from said front face to said annular face of said end shield, and inside walls extending from and substantially orthogonally to said ramp.

5. The motor according to claim 4, wherein said projection on said cover is receivable adjacent said inclined ramp, such that said inclined ramp guides said projection toward engagement with said slot.

6. The motor according to claim 1, including means for reducing vibration between said cover and said end shield, wherein said means for reducing vibration includes a crushable rib located on said backstop, said crushable rib being deformable by said bearing surface during mounting of said cover to said end shield.

7. The motor according to claim 6, wherein said backstop and said crushable rib abut and contact said bearing surface, forming a friction interface therebetween.

8. The motor according to claim 1, wherein a longitudinal distance from said backstop to said projection on said cover is approximately equal to a longitudinal distance from said front face to said slot on said end shield.

9. The motor according to claim 8, including means for eliminating differences between the longitudinal distance from said backstop to said projection and the longitudinal distance from said front face to said slot.

10. The motor according to claim 9, wherein said means includes a crushable rib, said crushable rib being disposed on said backstop and being deformable by said bearing surface during mounting of said cover to said end shield.

11. An electric motor, comprising
a frame;
a stator supported by said frame;
at least one end shield mounted to said frame for rotatably supporting a rotor adjacent said stator;
a fan mounted adjacent the end shield; and
a cover mounted adjacent the fan;
said end shield having a front face and an annular face and receiving means formed in the annular face for engaging a portion of said cover, said receiving means including at least one slot in said annular face, said slot being spaced from said front face and defining a longitudinal distance therebetween;
said cover including mounting means for cooperating with said receiving means, said mounting means including at least one mounting bracket extending from said cover, said bracket including a projection and at least one backstop thereon, said projection and backstop being spaced apart and defining a second longitudinal distance therebetween; and
means located on said mounting bracket for substantially eliminating any difference between said first distance and said second distance.

12. The motor according to claim 11, wherein said means located on said mounting bracket includes a crushable rib disposed on said backstop, said crushable rib being deformable by said end shield during mounting of said cover to said end shield.

13. The motor according to claim 11, wherein said crushable rib substantially reduces vibration between said cover and said end shield.

* * * * *